(12) United States Patent
Haydock et al.

(10) Patent No.: US 9,631,877 B2
(45) Date of Patent: Apr. 25, 2017

(54) FURNACE HEAT EXCHANGER COUPLING

(75) Inventors: Paul M. Haydock, Zionsville, IN (US);
Larry D. Rieke, Zionsville, IN (US);
Stephen L. Pulley, Carmel, IN (US);
Nitu Gupta, Westfield, IN (US); Scott A. Beck, Indianapolis, IN (US)

(73) Assignee: CARRIER CORPORATION, Farmington, CT (US)

( * ) Notice: Subject to any disclaimer, the term of this patent is extended or adjusted under 35 U.S.C. 154(b) by 637 days.

(21) Appl. No.: 13/247,533

(22) Filed: Sep. 28, 2011

(65) Prior Publication Data

US 2012/0085514 A1  Apr. 12, 2012

Related U.S. Application Data

(60) Provisional application No. 61/391,307, filed on Oct. 8, 2010.

(51) Int. Cl.
| | |
|---|---|
| F28F 9/02 | (2006.01) |
| F24H 3/08 | (2006.01) |
| F24H 3/10 | (2006.01) |
| F24H 8/00 | (2006.01) |
| F24H 9/14 | (2006.01) |
| F24H 3/00 | (2006.01) |
| F28F 1/00 | (2006.01) |
| F28F 9/22 | (2006.01) |
| F28D 21/00 | (2006.01) |

(52) U.S. Cl.
CPC ............ *F28F 9/02* (2013.01); *F24H 3/087* (2013.01); *F24H 3/105* (2013.01); *F24H 8/00* (2013.01); *F24H 9/146* (2013.01); *F24H 3/00* (2013.01); *F28D 21/0003* (2013.01); *F28F 1/00* (2013.01); *F28F 9/0246* (2013.01); *F28F 9/22* (2013.01); *Y02B 30/102* (2013.01)

(58) Field of Classification Search
CPC ... F28F 1/00; F28F 9/0246; F28F 9/22; F24H 3/00
USPC .............. 165/64–66, 76, 135, 173, 174
See application file for complete search history.

(56) References Cited

U.S. PATENT DOCUMENTS

| | | | | |
|---|---|---|---|---|
| 4,807,588 | A * | 2/1989 | Bentley et al. | 126/110 R |
| 5,103,374 | A * | 4/1992 | Azar | 361/689 |
| 5,178,124 | A * | 1/1993 | Lu et al. | 126/110 R |
| 5,345,924 | A * | 9/1994 | Rieke et al. | 126/110 R |
| 5,347,980 | A * | 9/1994 | Shellenberger | 126/110 R |
| 5,370,106 | A * | 12/1994 | Beck et al. | 126/110 R |
| 5,406,933 | A * | 4/1995 | Lu | 126/110 R |
| 5,408,986 | A * | 4/1995 | Bigham | 126/110 R |
| 5,437,263 | A * | 8/1995 | Ellingham et al. | 126/110 R |
| 5,439,050 | A * | 8/1995 | Waterman et al. | 165/170 |
| 5,474,122 | A * | 12/1995 | Pierce | 165/134.1 |
| 5,538,079 | A * | 7/1996 | Pawlick | F28D 1/05366 165/153 |

(Continued)

*Primary Examiner* — Jianying Atkisson
*Assistant Examiner* — Joel Attey
(74) *Attorney, Agent, or Firm* — Cantor Colburn LLP (57) ABSTRACT

A coupling to connect a primary heat exchanger to a condensing heat exchanger of a furnace includes a coupling box extending between a primary heat exchanger and a condensing heat exchanger. The coupling box defines a flow path for flue gas between a primary heat exchanger outlet and a condensing heat exchanger inlet. A tube sheet is located at a distance from the tube sheet in the coupling box. The liner and the tube sheet define an insulating liner space therebetween reducing condensation on the liner.

19 Claims, 8 Drawing Sheets

(56) References Cited

U.S. PATENT DOCUMENTS

| | | | |
|---|---|---|---|
| 5,881,681 A * | 3/1999 | Stuart | F23D 14/24 |
| | | | 122/18.31 |
| 6,006,741 A * | 12/1999 | Daddis, Jr. | 126/110 R |
| 6,296,051 B1 * | 10/2001 | Sahnoun | F28F 9/0226 |
| | | | 165/153 |
| 6,758,208 B2 * | 7/2004 | Gierula et al. | 126/116 A |
| 8,286,594 B2 * | 10/2012 | Smelcer | F23D 14/02 |
| | | | 122/13.3 |
| 2002/0023734 A1 * | 2/2002 | Wagner | 165/81 |
| 2005/0092316 A1 * | 5/2005 | Schonberger, Sr. | 126/110 R |
| 2005/0155535 A1 * | 7/2005 | Rieke et al. | 110/349 |
| 2005/0194119 A1 * | 9/2005 | Yamanaka et al. | 165/67 |
| 2006/0266071 A1 * | 11/2006 | Jung et al. | 62/497 |
| 2008/0023185 A1 * | 1/2008 | Beamer et al. | 165/174 |
| 2008/0289806 A1 * | 11/2008 | Gorbounov et al. | 165/173 |
| 2008/0314375 A1 * | 12/2008 | Khan | 126/116 R |
| 2008/0314378 A1 * | 12/2008 | Khan et al. | 126/99 R |
| 2009/0025914 A1 * | 1/2009 | Knight et al. | 165/144 |
| 2012/0103581 A1 * | 5/2012 | Seo et al. | 165/173 |
| 2012/0241139 A1 * | 9/2012 | Katoh et al. | 165/202 |

\* cited by examiner

FURNACE HEAT EXCHANGER COUPLING

CROSS REFERENCE TO RELATED APPLICATION

This application claims priority to U.S. provisional application, 61/391,307, filed Oct. 8, 2010, the entire contents of which are incorporated herein by reference.

BACKGROUND OF THE INVENTION

The subject matter disclosed herein relates to furnaces. More specifically, the present disclosure relates to a coupling between heat exchanger components of a multi-position gas furnace.

In a typical furnace, a fuel, for example, natural gas, is combusted in a burner. The byproduct of combustion, called flue gas, is routed through one or more heat exchangers which extract the heat therefrom. In a condensing gas furnace there are two types of heat exchangers: a primary heat exchanger (PHX) and a secondary or condensing heat exchanger (CHX). The PHX accounts for most of the efficiency of the furnace by reducing the heat of the flue gas from the flame temperature to a temperature well above the dew point temperature of the water in the flue gas. The flue gas heats the surface of the PHX and air is blown across the exterior of the PHX thus removing heat from the PHX by convection. Efficiency is measured by the amount of heat energy that is transferred out of the flue gas compared to the amount of heat energy that remains in the flue gas as it leaves the heat exchanger. It can be determined roughly by knowing how much air and gas enters and is burned in the PHX, and the temperature of the gas leaving the PHX. The CHX makes up the remainder of the furnace efficiency by reducing the flue gas temperature below the dew point of the flue gas and thus taking advantage of the latent heat from the water byproduct of combustion.

The PHX and CHX are connected via a coupling box, with flow from the PHX proceeding through the coupling box and into the CHX. Without adequate distribution of the flue gas through the coupling box, localized spots on parts of the coupling box may fall below the dew point temperature of the flue gas causing there to be localized condensation prior to the flue gas entering the CHX tubes. Baffles and other means to distribute the flue gas to all parts of the coupling box will increase internal pressure drop, which requires a larger combustion blower. The moisture deposits outside of the CHX reduce the effectiveness of the CHX and also can cause corrosion of components of the coupling box and/or PHX. Further, there is a desire to reduce the size of the furnace, if possible, to reduce cost and household space occupied by the furnace. If a furnace requires a larger combustion blower, the size of the blower will limit how much the overall size of the furnace can be reduced.

The furnace being a multiposition appliance must perform its intended function in the 4 major positions of upflow, laid horizontally on its left side, laid horizontally on its right side, and upside down, or downflow. If orientation was limited to a single position the CHX could be designed to provide a natural slope that would allow condensate formed in the tubes to drain by gravity in the direction of the slope. However, in order to accommodate multiple positions (that is more than 2 positions) the CHX must be designed to be level, with no intended slope within the appliance. Generally as the furnace operates and the combustion blower is operating to pull the gas through the CHX, it will provide enough flow velocity to assist with water drainage to the intended front of the furnace. When the furnace shuts off, there is no air flow through the CHX, and water remaining in the tubes will migrate to either the inlet or the outlet. If the furnace is installed in a residence in a way that the CHX tubes slope gradually backwards in the unit, gravity will tend to lead the remaining water to the back of the furnace where it can pool and cause a leak, or corrosion on parts that are not intended to handle condensate.

BRIEF DESCRIPTION OF THE INVENTION

According to one aspect of the invention, a coupling to connect a primary heat exchanger to a condensing heat exchanger of a furnace includes a coupling box extending between a primary heat exchanger and a condensing heat exchanger. The coupling box defines a flow path for flue gas between a primary heat exchanger outlet and a condensing heat exchanger inlet. A tube sheet is located at the condensing heat exchanger inlet and a liner is located at a distance from the tube sheet in the coupling box. The liner and the tube sheet define an insulating liner space therebetween reducing condensation on the liner.

According to another aspect of the invention, a heat exchanger assembly for a furnace includes a primary heat exchanger and a condensing heat exchanger in flow communication with the primary heat exchanger. A coupling connects the primary heat exchanger to the condensing heat exchanger and includes a coupling box extending between the primary heat exchanger and the condensing heat exchanger and defining a flow path for flue gas between a primary heat exchanger outlet and a condensing heat exchanger inlet. A tube sheet is located at the condensing heat exchanger inlet and a liner is located at a distance from the tube sheet in the coupling box. The liner and the tube sheet define an insulating liner space therebetween reducing condensation on the liner.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
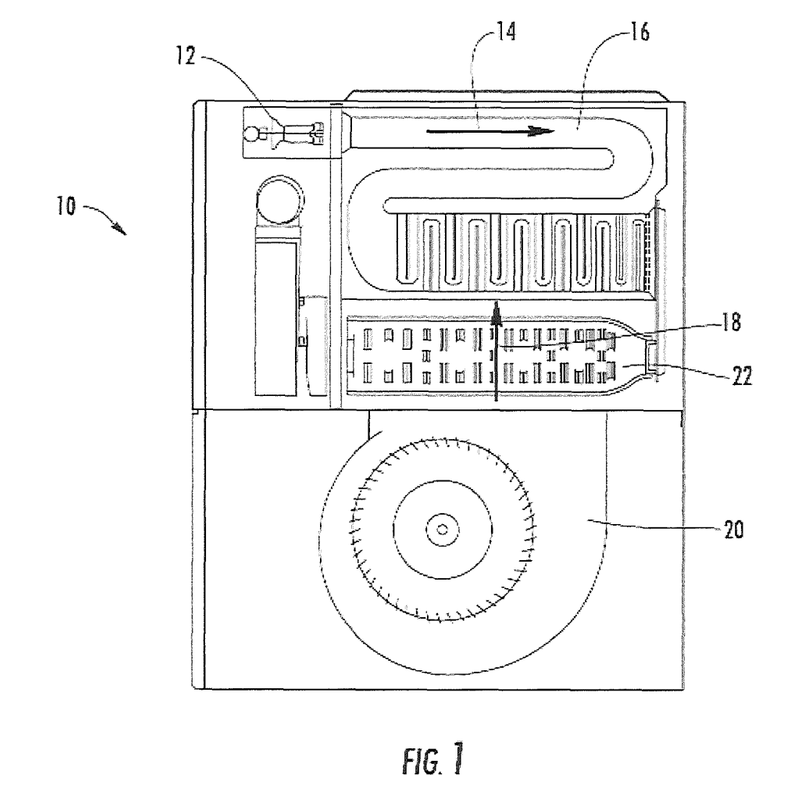
FIG. 1 is a schematic view of an embodiment of a furnace.

Shown in FIG. 1 is an embodiment of a furnace 10. The furnace 10 includes a burner 12 for combusting a fuel such as natural gas. Flue gas 14 exits the burner 12 and flows through a primary heat exchanger (PHX) 16. The PHX 16 is a gas-to-gas heat exchanger in which the flue gas 14 flowing through the PHX 16 transfers thermal energy to the surface of the PHX 16. The thermal energy is then dissipated from the surface of the PHX 16 into a flow of air 18 urged across the exterior of the PHX 16 by, for example, a blower 20. At an exit of the PHX 16, a temperature of the flue gas 14 is still at a level that exceeds a dew point temperature at which moisture will condense out of the flue gas 14. The flue gas 14 then flows into a condensing heat exchanger (CHX) 22 in which the temperature of the flue gas 14 is lowered and walls of the CHX 22 are below the dew point causing condensation of the flue gas 14 and further removing thermal energy from the flue gas 14.

Figure 2:
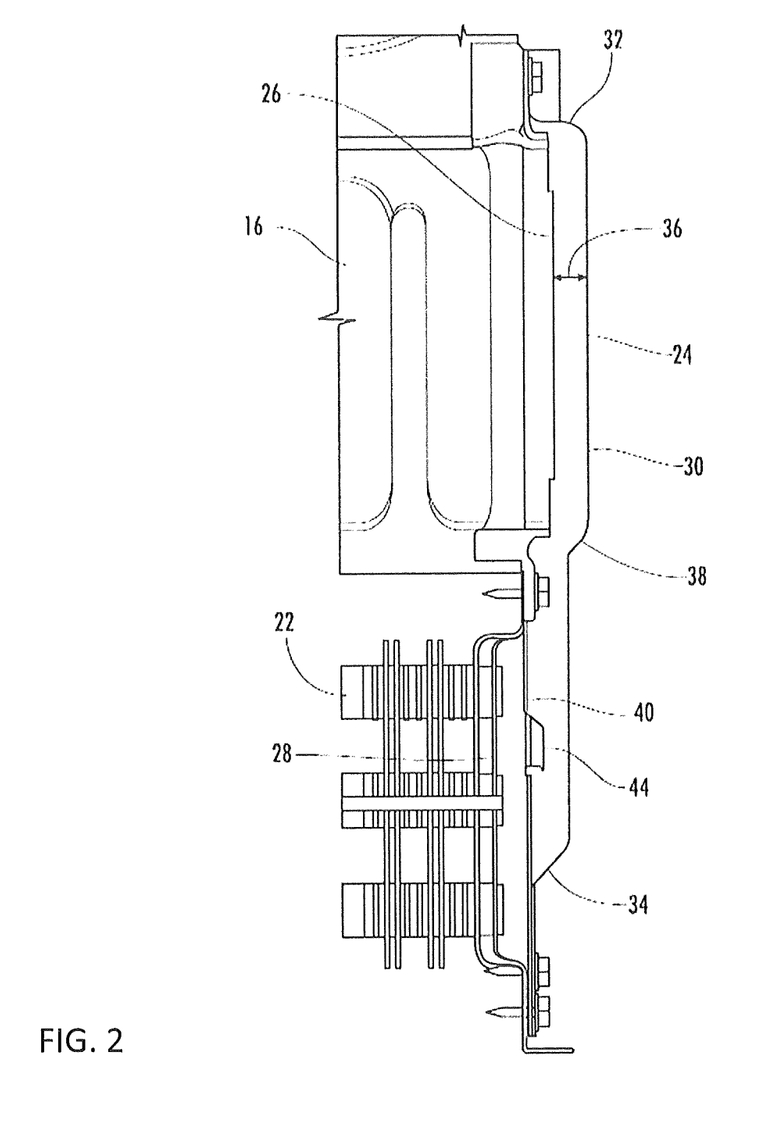
FIG. 2 is a cross-sectional view of a heat exchanger portion of an embodiment of a furnace.
Figure 6:
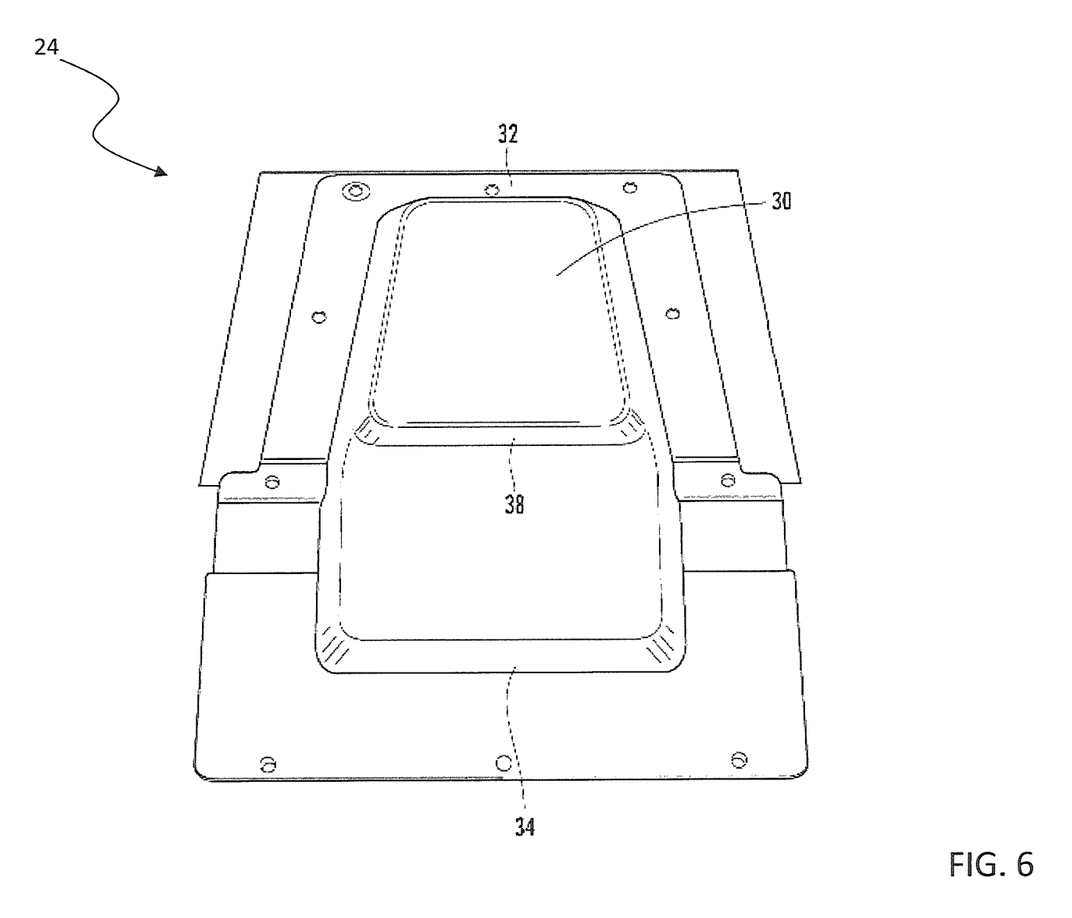
FIG. 6 is a plan view of an embodiment of a coupling pan.

Referring to FIGS. 2 and 6, the PHX 16 and CHX 22 are connected via a coupling box 24. The coupling box 24 is defined on one side by a PHX outlet 26 and a CHX inlet 28, and on another side by a coupling pan 30. The coupling pan 30 is connected at a first end 32 to the PHX 16 and a second end 34 to the CHX 22. The coupling pan 30 is formed with multiple depths to accommodate a protrusion of the PHX outlet 26 and preserve a consistent coupling box depth 36. A transition 38 is located between the PHX 16 and CHX 22 at a location to reduce cold spots in the coupling box 24. Further, the second end 34 is sloped, and pan edges 62 are tapered, shown best in FIG. 6, to improve manufacturability of the coupling pan 30 and to improve thermal energy distribution in the coupling box 24.

Figure 3:
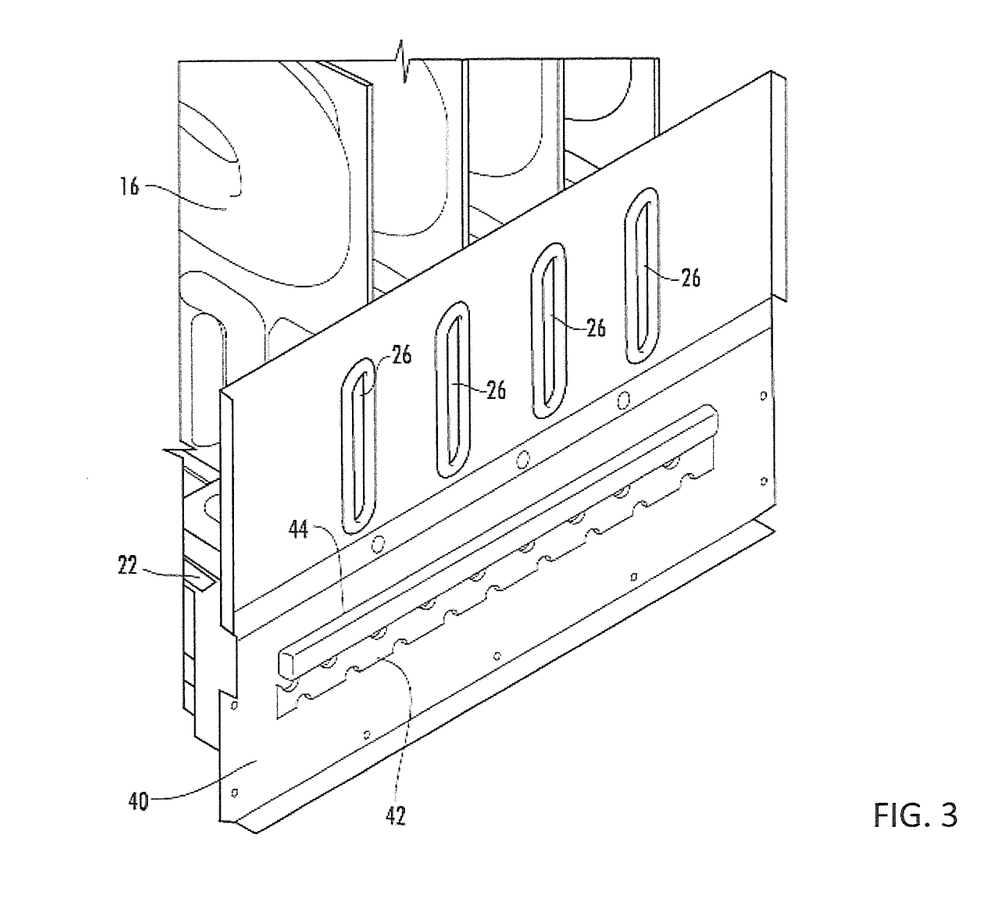
FIG. 3 is a partial perspective view of an embodiment of a heat exchanger.
Figure 4:
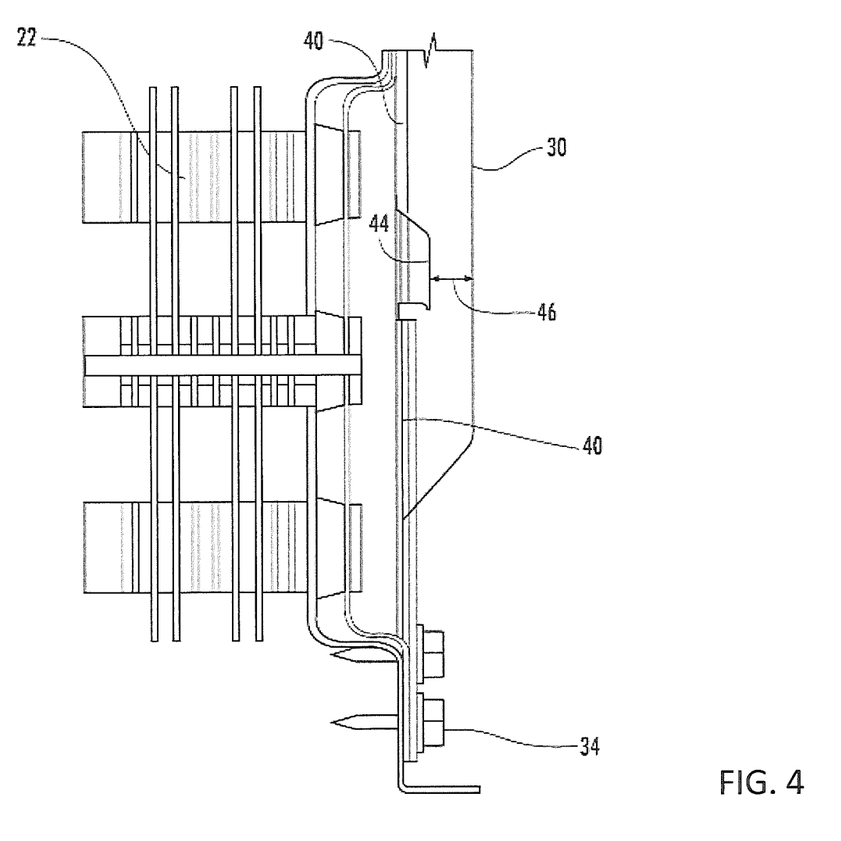
FIG. 4 is a cross-sectional view of a containment area of an embodiment of a heat exchanger.
Figure 5A:
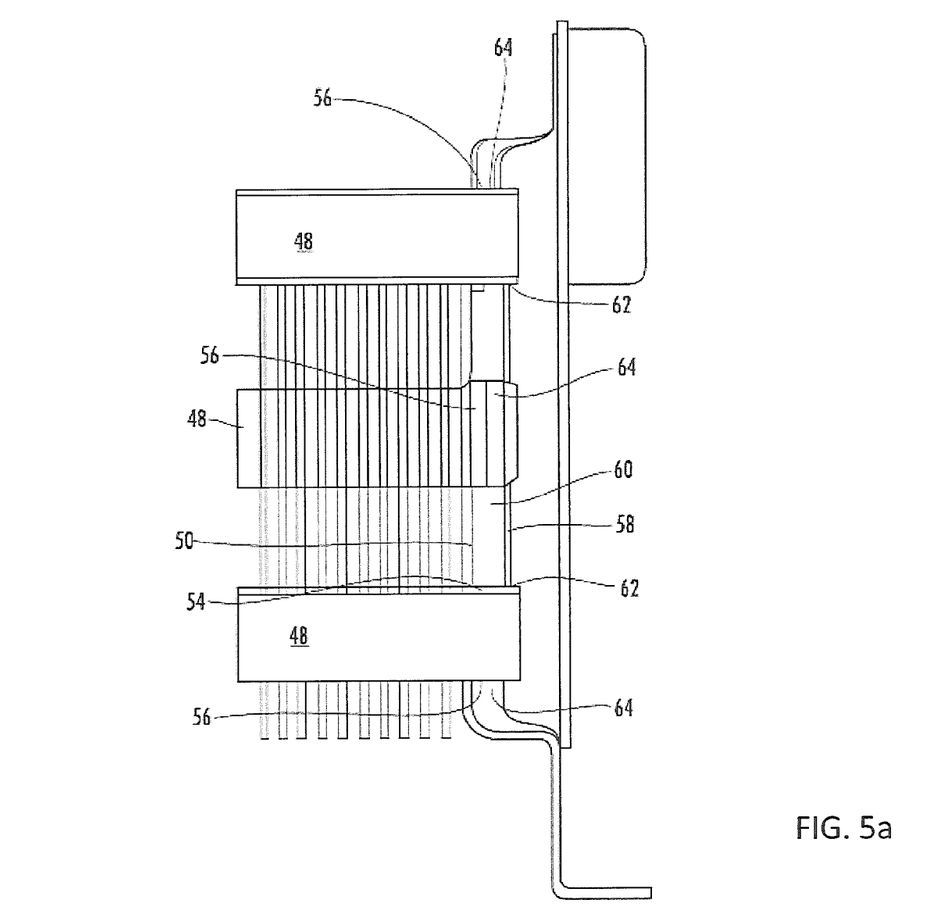
FIGS. 5a-5d are various cross-sectional and front views of an embodiment of a tube sheet and liner of an heat exchanger.
Figure 5B:
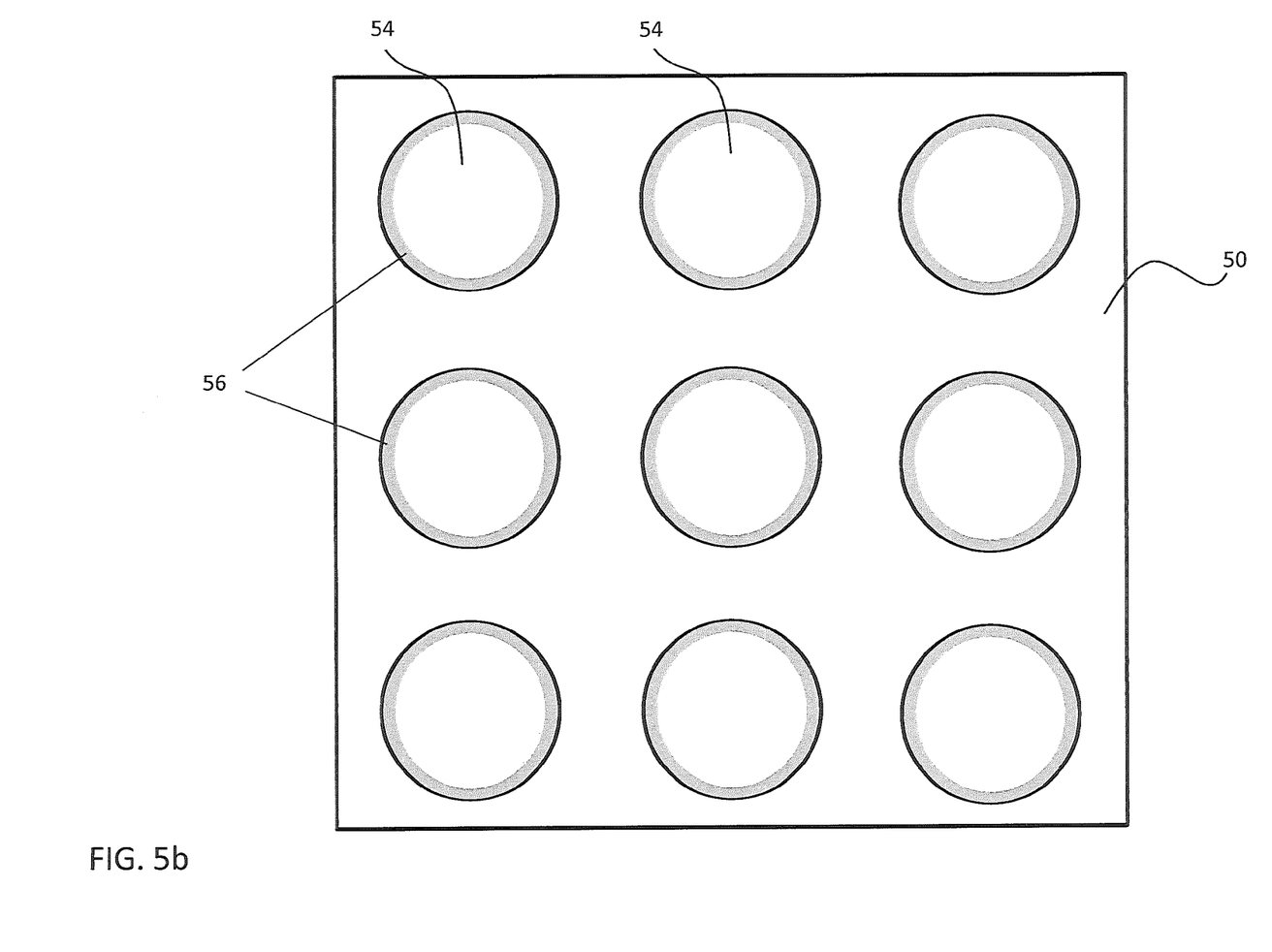
Figure 5C:
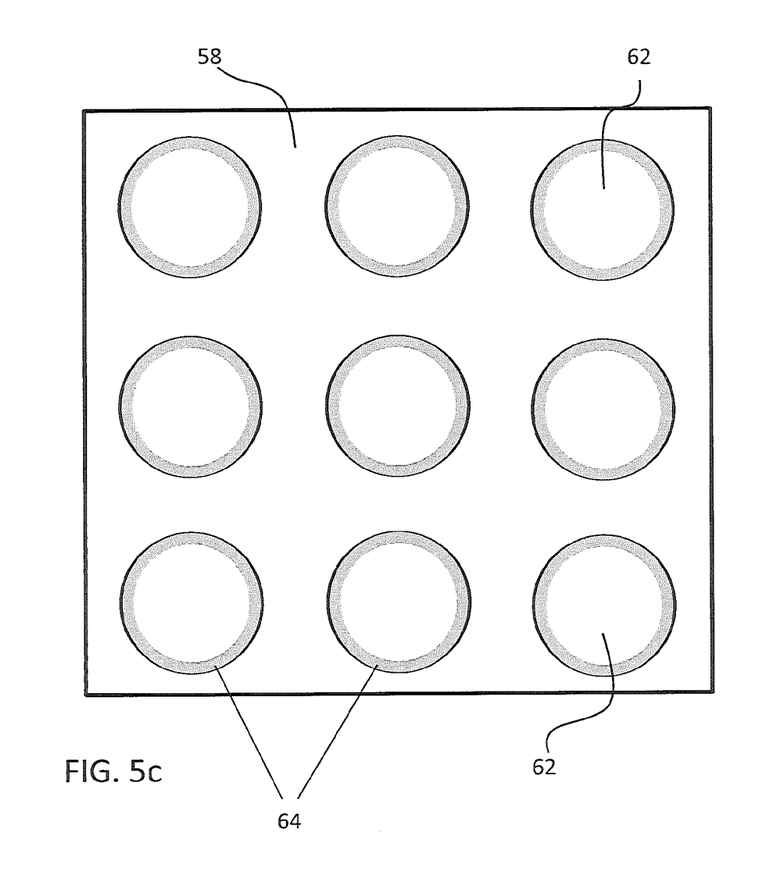
Figure 5D:
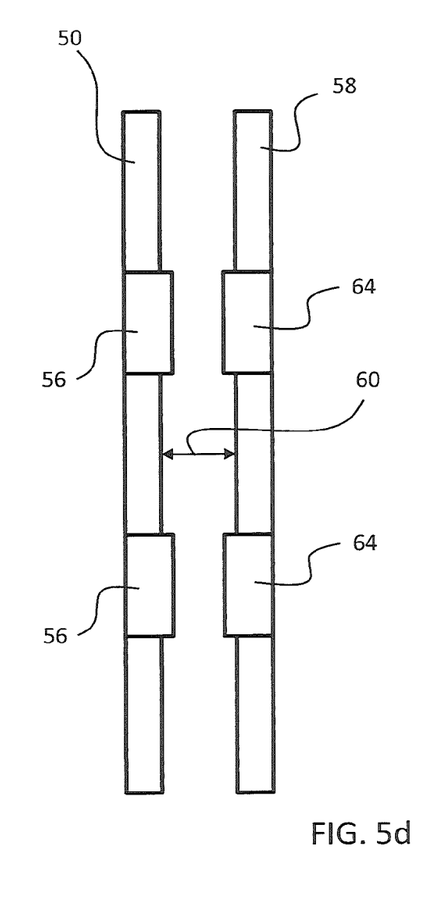

Referring to FIG. 3, a containment plate 40 is located in the coupling box 24 at the CHX inlet 28. The containment plate 40 has one or more plate openings 42 therethrough to allow the flow of flue gas 14 through the coupling box 24 and into the CHX 22. The containment plate 40 includes a lip 44 extending from the plate opening 42 to direct the flue gas through the plate opening 42. As shown in FIG. 4, the lip 44 extends toward the coupling pan 30 and defines a lip gap 46 between the lip 44 and the coupling pan 30. The lip gap 46 is sized to provide a small resistance to the flow and thereby force the flue gas 14 to spread out from side to side in the coupling box 24 to provide thermal heating of the coupling pan 30 and thereby reduce cold spots. The lip gap 46 is also sized for balance so as not to increase resistance to flow of the flue gas 14 by too great amount and thereby maintain a lower pressure drop across the PHX 16 and CHX 22. Maintaining a lower pressure drop helps to reduce the size of the combustion blower 20 needed for the furnace 10 and as a result increases effectiveness of the PHX 16 and CHX 22.

Referring to FIGS. 5a-5d, the CHX 22 comprises a plurality of CHX tubes 48 which extend through a tube sheet 50 at a tube inlet. To accommodate the CHX tubes 48 passing through the tube sheet 50, the tube sheet 50 includes a plurality of tube sheet openings 54, each having a tube sheet collar 56 which extends outwardly toward the coupling box 24. The tube sheet 50 is secured to the CHX tubes 48 at the tube sheet collar 56. A liner 58 is located over the tube sheet 50 defining a liner space 60 between the liner 58 and the tube sheet 50. Similar to the tube sheet 50, the liner 58 includes a plurality of liner openings 62 though which the CHX tubes 48 pass. Each liner opening 62 includes a liner collar 64 which extends toward, and in some embodiments, abuts the tube sheet collar 56. The liner 58 is secured to the CHX tubes 48 at the liner collar 64. The liner collar 64 extending toward the tube sheet collar 56 ensures that the liner space 60 will be a desired size, while preventing damage to the liner 58 when assembling the liner 58 to the CHX 22 and the tube sheet 50. The liner space 60 serves to insulate the liner 58 from the CHX 22, thus preventing condensation on the liner 58.

In some embodiments, the liner 58 and the containment plate 40 are formed from a corrosion-resistant material such as 29-4C steel or the like to define a corrosion-resistant containment space 66 for collection of condensate in the event of, for example, back flow from the CHX tubes 48. The plate opening 42 is sized and positioned to prevent water that collects in a containment area, defined by the liner 58 and the containment plate 40, from flowing over the plate opening 42 in the case that the CHX tubes 48 are not level because the furnace 10 is installed at an angle such that the front of the furnace is about ½-inch higher than the back of the furnace, or about 1° in some embodiments, in any position which the furnace 10 is installed. Thus the furnace 10 may be located and out of level in any position while preventing corrosion in the heat exchanger portion of the furnace 10. It is to be appreciated that it may be desired to utilize angles other than 1 to achieve a desired out of level position of the furnace 10.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A coupling to connect a primary heat exchanger to a condensing heat exchanger of a furnace comprising:
    a coupling box extending between a primary heat exchanger and a condensing heat exchanger and defining a flow path for flue gas between a primary heat exchanger outlet and a condensing heat exchanger inlet;
    a tube sheet secured to at least one tube of the condensing heat exchanger, the tube sheet being disposed at the condensing heat exchanger inlet, wherein the tube sheet is secured to the at least one tube via a tube sheet collar, the tube sheet collar is wider than the tube sheet such that a portion of the tube sheet collar extends beyond the tube sheet towards the coupling box;
    a liner disposed in the coupling box and secured to at least one tube of the condensing heat exchanger via at least one liner collar, the liner collar is wider than the liner such that a portion of the liner collar extends beyond the liner towards the at least one tube sheet collar, the liner being arranged parallel to and separated from the tube sheet such that the at least one liner collar and the at least one tube sheet collar abut one another to define an insulating liner space between the tube sheet and the liner, and such that the insulating liner space is continuous for all tubes secured to the liner and the tube sheet collar.

2. The coupling of claim 1, wherein the tube sheet includes one or more tube sheet openings through which one or more condensing heat exchanger tubes extend.

3. The coupling of claim 2, wherein each tube sheet opening includes a tube sheet collar extending toward the coupling box.

4. The coupling of claim 3, wherein the liner includes one or more liner openings through which one or more condensing heat exchanger tubes extend.

5. The coupling of claim 4, wherein each liner opening includes a liner collar extending toward the tube sheet collar.

6. The coupling of claim 1, comprising a containment plate disposed over the liner defining a containment area.

7. The coupling of claim 6, including one or more plate openings in the containment plate to direct flue gas to the condensing heat exchanger.

8. The coupling of claim 6, wherein the containment plate and/or the liner are formed of a 29-4 C steel material.

9. The coupling of claim 6, wherein the containment plate includes a lip extending toward the coupling box.

10. A heat exchanger assembly for a furnace comprising:
a primary heat exchanger;
a condensing heat exchanger in flow communication with the primary heat exchanger;
a coupling to connect the primary heat exchanger to the condensing heat exchanger including:
a coupling box extending between the primary heat exchanger and the condensing heat exchanger and defining a flow path for flue gas between a primary heat exchanger outlet and a condensing heat exchanger inlet;
a tube sheet secured to at least one tube of the condensing heat exchanger, the tube sheet being disposed at the condensing heat exchanger inlet;
a liner disposed in the coupling box and secured to at least one tube of the condensing heat exchanger via at least one liner collar, the liner collar is wider than the liner such that a portion of the liner collar extends beyond the liner towards the at least one tube sheet, the liner being arranged parallel to and separated from the tube sheet such that the at least one liner collar and a portion of the at least one tube sheet being arranged in contact to define an insulating liner space between the tube sheet and the liner, and such that the insulating liner space is continuous for all tubes secured to the liner and the tube sheet collar.

11. The assembly of claim 10, wherein the tube sheet includes one or more tube sheet openings through which one or more condensing heat exchanger tubes extend.

12. The assembly of claim 11, wherein each tube sheet opening includes a tube sheet collar extending toward the coupling box.

13. The assembly of claim 12, wherein the liner includes one or more liner openings through which one or more condensing heat exchanger tubes extend.

14. The assembly of claim 13, wherein each liner opening includes a liner collar extending toward the tube sheet collar.

15. The assembly of claim 10, comprising a containment plate disposed over the liner defining a containment area.

16. The assembly of claim 15, including one or more plate openings in the containment plate to direct flue gas to the condensing heat exchanger.

17. The assembly of claim 15, wherein the containment plate and/or the liner are formed of a 29-4 C steel material.

18. The assembly of claim 15, wherein the containment plate includes a lip extending toward the coupling box.

19. A coupling to connect a primary heat exchanger to a condensing heat exchanger of a furnace comprising:
a coupling box extending between a primary heat exchanger and a condensing heat exchanger and defining a flow path for flue gas between a primary heat exchanger outlet and a condensing heat exchanger inlet;
a tube sheet secured to at least one tube of the condensing heat exchanger, the tube sheet being disposed at the condensing heat exchanger inlet, wherein the tube sheet is secured to the at least one tube via a tube sheet collar, the tube sheet collar being wider than the tube sheet such that a portion of the tube sheet collar extends beyond the tube sheet towards the coupling box;
a liner disposed in the coupling box and secured to at least one tube of the condensing heat exchanger, the liner being arranged parallel to and separated from the tube sheet such that the tube sheet collar and a portion of the liner are arranged in contact to define an insulating liner space between the tube sheet and the liner, and such that the insulating liner space is continuous for all tubes secured to the liner and the tube sheet collar.

* * * * *